United States Patent
Bates et al.

(10) Patent No.: US 8,024,521 B2
(45) Date of Patent: Sep. 20, 2011

(54) ATOMIC OPERATION ON NON-STANDARD SIZED DATA USING EXTERNAL CACHE

(75) Inventors: John P. Bates, Redwood City, CA (US);
James E. Marr, Burlingame, CA (US);
Attila Vass, Foster City, CA (US)

(73) Assignee: Sony Computer Entertainment Inc., Tokyo (JP)

( * ) Notice: Subject to any disclaimer, the term of this patent is extended or adjusted under 35 U.S.C. 154(b) by 522 days.

(21) Appl. No.: 11/685,649

(22) Filed: Mar. 13, 2007

(65) Prior Publication Data

US 2008/0229032 A1 Sep. 18, 2008

(51) Int. Cl.
*G06F 12/08* (2006.01)
(52) U.S. Cl. ............ 711/118; 711/150; 711/E12.026
(58) Field of Classification Search ............ 711/150, 711/152
See application file for complete search history.

(56) References Cited

U.S. PATENT DOCUMENTS

| | | | |
|---|---|---|---|
| 5,581,777 A | 12/1996 | Kim et al. | |
| 5,835,946 A * | 11/1998 | Allen et al. ................ | 711/122 |
| 5,864,706 A | 1/1999 | Kurokawa et al. | |
| 5,864,738 A | 1/1999 | Kessler et al. | |
| 6,029,212 A | 2/2000 | Kessler et al. | |
| 7,274,706 B1 | 9/2007 | Nguyen et al. | |
| 7,293,143 B1 * | 11/2007 | Shavit et al. ................ | 711/147 |
| 7,398,368 B2 | 7/2008 | Marr et al. | |
| 7,506,123 B1 | 3/2009 | Labour et al. | |
| 7,509,463 B2 | 3/2009 | Marr et al. | |
| 7,730,265 B1 * | 6/2010 | Cypher et al. ................ | 711/141 |
| 2002/0087815 A1 * | 7/2002 | Arimilli et al. ................ | 711/155 |
| 2003/0065896 A1 * | 4/2003 | Krueger ................ | 711/164 |
| 2004/0187123 A1 * | 9/2004 | Tremblay et al. ................ | 718/100 |
| 2004/0236914 A1 * | 11/2004 | Day et al. ................ | 711/152 |
| 2005/0120185 A1 | 6/2005 | Yamazaki et al. | |
| 2006/0010297 A1 * | 1/2006 | Brenner ................ | 711/150 |
| 2006/0085604 A1 * | 4/2006 | Guthrie et al. ................ | 711/141 |
| 2006/0090035 A1 * | 4/2006 | Guthrie et al. ................ | 711/125 |
| 2006/0212653 A1 * | 9/2006 | Alexander et al. ............ | 711/122 |
| 2007/0073987 A1 * | 3/2007 | Zohar et al. ................ | 711/162 |
| 2007/0220213 A1 * | 9/2007 | Johns ................ | 711/152 |

OTHER PUBLICATIONS

Pham, D. et al. "The Design and Implementation of a First-Generation Cell Processor." Feb. 2005. IEEE. ISSCC 2005.*
Eichenberger, Alexandre E. et al. "Optimizing Compiler for a CELL Processor." Sep. 2005. IEEE. PACT 2005.*
Moore, Kevin E. et al. "LogTM: Log-based Transactional Memory." Feb. 2006. IEEE. HPCA 2006.*
Flachs, B. et al. "A Streaming Processing Unit for a CELL Processor." Feb. 2005. IEEE. ISSCC 2005.*

(Continued)

*Primary Examiner* — Reginald Bragdon
*Assistant Examiner* — Nathan Sadler
(74) *Attorney, Agent, or Firm* — Joshua D. Isenberg; JDI Patent

(57) ABSTRACT

Atomic operation may be implemented in a processor system comprising a main memory and a power processor element (PPE) including a power processor unit (PPU) coupled to an external cache. The PPE may atomically load data from a lock-line in the main memory into a first location X in the external cache. A size of the data and the lock line may be larger than a data size for the standard atomic operations that may be performed with the PPE. The data may be reserved in a second location Y in the external cache.

23 Claims, 2 Drawing Sheets

OTHER PUBLICATIONS

May, Cathy; Ed Silha; Rick Simpson; and Hank Warren. The PowerPC Architecture: A Specification for a New Family of RISC Processors. May 1994. Morgan Kaufmann Publishers, Inc. 2nd ed. pp. 4-5, 322-323, and 328-331.*

Patterson, David A. and John L. Hennessy. Computer Organization & Design. 1998. Morgan Kaufmann Publishers, Inc. $2^{nd}$ ed. p. 576.*

John L. Hennessy and David A. Patterson. Computer Organization and Design: The Hardware/Software Interface. 1998. Morgan Kaufmann. pp. 540-544.*

Maurice Herlihy and J. Eliot B. Moss. "Transactional Memory: Architectural Support for Lock-Free Data Structures." 1993. ACM. ISCA 1993.*

John L. Hennessy and David A. Patterson. Computer Architecture: A Quantitative Approach. 2003. Morgan Kaufmann. $3^{rd}$ ed. pp. 417-418.*

Stefan Andersson, Ron Bell, John Hague, Holger Holthoff, Peter Mayes, Jun Nakano, Danny Shieh, and Jim Tuccillo. "RS/6000 Scientific and Technical Computing: POWER3 Introduction and Tuning Guide." Oct. 1998. IBM. SG24-5155-00. pp. 7-8, 181-197.*

How Stuff Works "How Virtual Memory Works", downloaded from <http://www.howstuffworks.com/virtual-memory.htm>, copyright 1998-2010, downloaded from the Internet Feb. 19, 2010.

"Primary cache: Definition from Answers.com", downloaded from <http://www.answers.com/topic/primary-cache-computer-science>, downloaded from the Internet Feb. 19, 2010.

Notice of Allowance dated Jan. 25, 2008 for U.S. Appl No. 11/291,306.

Non-final Office Action dated Feb. 1, 2008 for U.S. Appl No. 11/291,307.

Notice of Allowance dated. Sep. 12, 2008 for U.S. Appl No. 11/291,307.

Sony Computer Entertainment Incorporated, "Cell Broadband Engine Architecture", Version 1.0. Aug. 8, 2005.

* cited by examiner

ATOMIC OPERATION ON NON-STANDARD SIZED DATA USING EXTERNAL CACHE

CROSS-REFERENCE TO RELATED APPLICATION

This application is related to commonly-assigned U.S. patent application Ser. No. 11/291,307 entitled "CELL PROCESSOR ATOMIC COMPARE AND SWAP USING DEDICATED SPE" to James E. Marr and John P. Bates, filed Dec. 1, 2005, and issued as the U.S. Pat. No. 7,509,463 on Mar. 24, 2009, the entire disclosures of which are incorporated herein by reference.

This application is related to commonly-assigned U.S. patent application Ser. No. 11/291,306 entitled "ATOMIC OPERATION INVOLVING PROCESSORS WITH DIFFERENT MEMORY TRANSFER OPERATION SIZES" to James E. Marr, John P. Bates and Tatsuya Iwamoto, filed Dec. 1, 2005, and issued as the U.S. Pat. No. 7,398,368 on Jul. 8, 2008, the entire disclosures of which are incorporated herein by reference.

FIELD OF THE INVENTION

This invention relates to cell processors and more particularly to atomic operations with cell processors.

BACKGROUND OF THE INVENTION

Cell processors are a type of microprocessor that utilizes parallel processing. The basic configuration of a cell processor includes a "Power Processor Element" ("PPE") (sometimes called "Processing Element", or "PE"), and multiple "Synergistic Processing Elements" ("SPE"). The PPEs and SPEs are linked together by an internal high speed bus dubbed "Element Interconnect Bus" ("EIB"). Cell processors are designed to be scalable for use in applications ranging from the hand held devices to main frame computers. Cell processors may manage multiple tasks using a task management system based on a software concept referred to as "threads". A "thread" generally refers to a part of a program that can execute independently of other parts. Operating systems that support multithreading enable programmers to design programs whose threaded parts can execute concurrently.

A typical cell processor has one PPE and up to 8 SPE. Each SPE is typically a single chip or part of a single chip containing a main processor and a co-processor. Each SPE typically includes a synergistic processor unit (SPU) and a local store (LS). The PPE typically includes a power processor element (PPU) and one or more caches. All of the SPEs and the PPE can access a main memory, e.g., via the bus. The SPEs can perform parallel processing of operations in conjunction with a program running on the PPE. To coordinate processes executing in parallel on the SPE and PPE, atomic operations are often implemented. An atomic operation is one in which an SPU or PPU can read or write to a memory address (often referred to as an atomic) in a single operation while denying other processors access to the atomic. Atomic operations can be mutual exclusion (muxtex) "locked" operations or "lock-free" operations. In a mutex operation, a processor locks the atomic and prevents other processors from writing to it until it is unlocked. In a "lock-free" atomic operation, only one processor can write to the atomic address at a time, but other processors can write over what has been atomically written. Lock-free atomic operations utilize "reservation" operations that notify a processor making the reservation whether an atomic has been overwritten since the reservation was made.

A problem with atomic operations on prior art cell processors is that the PPU and SPU have different reservations sizes for atomic operations. These different atomic operation sizes are a result of different sized memory access capabilities of the PPU and SPU. The PPU's memory access is generally limited by the register size of the PPU core. The cell processor architecture does not define how large the atomic operation size is for the SPU. However, the SPU can access the main memory through a memory flow controller (MFC), which can transfer data in increments much larger than the register size of the PPU core. For example, in certain types of cell processors, the MFC for an SPU can transfer data into and out of main memory in 128 byte chunks (or smaller) but the PPU can transfer data in only 8 byte chunks (or smaller). The maximum PPU memory transfer size for a single operation is determined by the size of the PPU register set. The PPU register length is 64 bits, 8 bytes of 8 bits each. The MFC sets the SPU atomic size. The SPU local store is in the form of 16 byte, 128 bit registers. The SPU local store registers are not tied to any main memory address. The SPU communicates with memory through the MFC, which operates on 128 byte chunks. The MFC handles direct memory access (DMA) operations for both atomic and non-atomic operations for the SPU. In certain cell implementations, all atomic operations on the SPU are 128 bytes. However, non-atomic operations are also handled by the MFC and can range in size from 1 byte to 16 kilobytes. Thus, SPUs perform read with reservation and copy 128 bytes into their local stores. The reservation granule can be any size. It will logically work correctly as long as it is larger than the atomic access size.

It is very powerful that the SPU can work atomically on large chunks of data and it can potentially be quite crippling that the PPU can only work atomically on 8 bytes at a time. Such different sizes for atomic reservations can limit the features of a lock-free algorithm. Linked lists without mutex can be done using lock-free algorithms. However, if larger atomics are available, one can apply lock-free algorithms to more complex operations since more than one integer may be atomically modified at a time.

Thus, there is a need in the art, for a way to perform atomic operations with a cell processor where the PPE and SPE have different-sized register lines.

SUMMARY OF THE INVENTION

The disadvantages associated with the prior art are overcome by embodiments of the present invention related to atomic operation in a processor system comprising a main memory and a power processor element (PPE) including an external cache. Data is loaded with the PPE from a lock-line in the main memory into a first location X in the external cache. The data is reserved in a second location Y in the external cache. A data size for the lock-line is larger than a data size for standard atomic operations that may be performed with the PPE.

BRIEF DESCRIPTION OF THE DRAWINGS

The teachings of the present invention can be readily understood by considering the following detailed description in conjunction with the accompanying drawings, in which.

DESCRIPTION OF THE SPECIFIC EMBODIMENTS

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

In embodiments of the present invention a modified Cell processor includes one or more Power Processor Elements (PPE) that can supports large-sized atomic (e.g., 128-byte) operations that are as large as the largest atomic operations that can be supported by the Synergistic Processor Elements (SPE). In such a modified Cell processor the PPE can more effectively communicate with SPEs.

In addition, embodiments of the present invention may be used in a stand-alone PPE or similar processor that is not part of a Cell processor. Such large atomics would allow more complex and more powerful lock-free algorithms, even if only one processor is involved.

A previous atomic operation technique for a Cell processor is described in commonly assigned U.S. patent application Ser. No. 11/291,306. That technique utilized a two-part primitive with a parity bit to facilitate atomic operation involving processors with different memory transfer operation sizes. A drawback to this technique was that only one thread running on a PPE could safely access the atomic, along with all the SPEs. In addition, the overhead for managing the parity bit and the reservation of half of the atomic are sub-optimal. As will be explained below, embodiments of the present invention overcome these drawbacks.

Another previous atomic operation technique for a Cell processor is described in commonly assigned U.S. patent application Ser. No. 11/291,307. That technique utilized a dedicated SPE for an atomic compare and swap operation. This technique had some performance limitations because it was not a native PPE operation. As will be explained below, embodiments of the present invention implement atomic operations using a lock-line that does not require a dedicated SPE.

Figure 1:
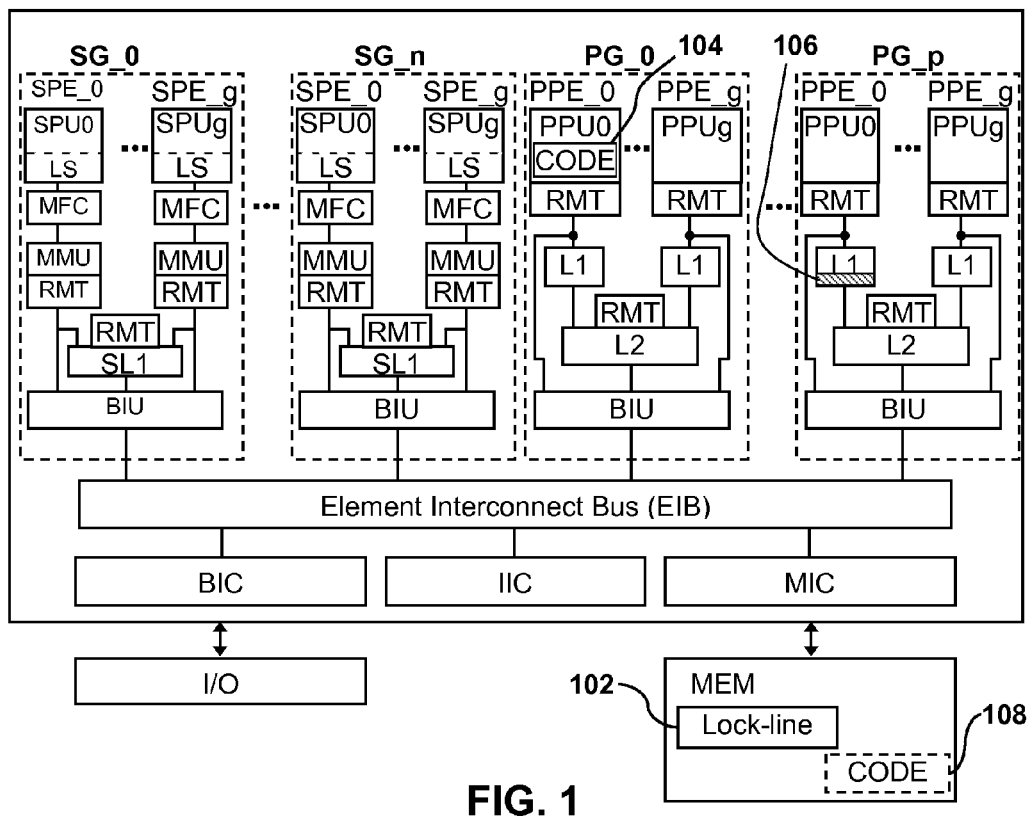
FIG. 1 is a schematic diagram of a cell broadband engine architecture configured to implement atomic operations according to an embodiment of the present invention.

By way of example, and without limitation, FIG. 1 illustrates a type of cell processor 100 characterized by an architecture known as Cell Broadband engine architecture (CBEA)-compliant processor. A cell processor can include multiple groups of PPEs (PPE groups) and multiple groups of SPEs (SPE groups) as shown in this example. Alternatively, the cell processor may have only a single SPE group and a single PPE group with a single SPE and a single PPE. Hardware resources can be shared between units within a group. However, the SPEs and PPEs must appear to software as independent elements.

In the example depicted in FIG. 1, the cell processor 100 includes a number of groups of SPEs SG-0 . . . SG_n and a number of groups of PPEs PG_0 . . . PG_p. Each SPE group includes a number of SPEs SPE0 . . . SPEg. The cell processor 100 also includes a main memory MEM and an input/output function I/O.

Each PPE group includes a number of PPEs PPE_0 . . . PPE_g SPE. In this example a group of SPEs shares a single cache SL1. The cache SL1 is a first-level cache for direct memory access (DMA) transfers between local storage and main storage. Each PPE in a group has its own first level (internal) cache L1. In addition the PPEs in a group may share a single second-level (external) cache L2. While caches are shown for the SPE and PPE in FIG. 1, they are optional for cell processors in general and CBEA in particular.

An Element Interconnect Bus EIB connects the various components listed above. The SPEs of each SPE group and the PPEs of each PPE group can access the EIB through bus interface units BIU. The cell processor 100 also includes two controllers typically found in a processor: a Memory Interface Controller MIC that controls the flow of data between the EIB and the main memory MEM, and a Bus Interface Controller BIC, which controls the flow of data between the I/O and the EIB. Although the requirements for the MIC, BIC, BIUs and EIB may vary widely for different implementations, those of skill in the art will be familiar their functions and circuits for implementing them.

Each SPE is made includes an SPU (SPU0 . . . SPUg). Each SPU in an SPE group has its own local storage area LS and a dedicated memory flow controller MFC that includes an associated memory management unit MMU that can hold and process memory-protection and access-permission information.

The PPEs may be 64-bit PowerPC Processor Units (PPUs) with associated caches. A CBEA-compliant system includes a vector multimedia extension unit in the PPE. The PPEs are general-purpose processing units, which can access system management resources (such as the memory-protection tables, for example). Hardware resources defined in the CBEA are mapped explicitly to the real address space as seen by the PPEs. Therefore, any PPE can address any of these resources directly by using an appropriate effective address value. A primary function of the PPEs is the management and allocation of tasks for the SPEs in a system.

The SPUs are less complex computational units than PPEs, in that they do not perform any system management functions. They generally have a single instruction, multiple data (SIMD) capability and typically process data and initiate any required data transfers (subject to access properties set up by a PPE) in order to perform their allocated tasks. The purpose of the SPU is to enable applications that require a higher computational unit density and can effectively use the provided instruction set. A significant number of SPUs in a system, managed by the PPEs, allow for cost-effective processing over a wide range of applications. The SPUs implement a new instruction set architecture.

MFC components are essentially the data transfer engines. The MFC provides the primary method for data transfer, protection, and synchronization between main storage of the cell processor and the local storage of an SPE. An MFC command describes the transfer to be performed. A principal architectural objective of the MFC is to perform these data transfer operations in as fast and as fair a manner as possible, thereby maximizing the overall throughput of a cell processor. Commands for transferring data are referred to as MFC DMA commands. These commands are converted into DMA transfers between the local storage domain and main storage domain.

Each MFC can typically support multiple DMA transfers at the same time and can maintain and process multiple MFC commands. In order to accomplish this, the MFC maintains and processes queues of MFC commands. The MFC can queue multiple transfer requests and issues them concurrently. Each MFC provides one queue for the associated SPU (MFC SPU command queue) and one queue for other processors and devices (MFC proxy command queue). Logically, a set of MFC queues is always associated with each SPU in a cell processor, but some implementations of the architecture can share a single physical MFC between multiple SPUs, such as an SPU group. In such cases, all the MFC facilities must appear to software as independent for each SPU. Each MFC DMA data transfer command request involves both a local storage address (LSA) and an effective address (EA). The local storage address can directly address only the local storage area of its associated SPU. The effective address has a more general application, in that it can reference main storage, including all the SPE local storage areas, if they are aliased into the real address space (that is, if MFC_SR1[D] is set to '1').

An MFC presents two types of interfaces: one to the SPUs and another to all other processors and devices in a processing group. The SPUs use a channel interface to control the MFC. In this case, code running on an SPU can only access the MFC SPU command queue for that SPU. Other processors and devices control the MFC by using memory-mapped registers. It is possible for any processor and device in the system to control an MFC and to issue MFC proxy command requests on behalf of the SPU. The MFC also supports bandwidth reservation and data synchronization features. To facilitate communication between the SPUs and/or between the SPUs and the PPU, the SPEs and PPEs may include signal notification registers that are tied to signaling events. Typically, the PPEs and SPEs are coupled by a star topology in which the PPE acts as a router to transmit messages to the SPEs. Such a topology does not provide for direct communication between SPEs. Instead each SPE and each PPE has a one-way signal notification register referred to as a mailbox. The mailbox can be used for SPE to host OS synchronization.

The IIC component manages the priority of the interrupts presented to the PPEs. The main purpose of the IIC is to allow interrupts from the other components in the processor to be handled without using the main system interrupt controller. The IIC is really a second level controller. It is intended to handle all interrupts internal to a CBEA-compliant processor or within a multiprocessor system of CBEA-compliant processors. The system interrupt controller will typically handle all interrupts external to the cell processor.

In a cell processor system, software often must first check the IIC to determine if the interrupt was sourced from an external system interrupt controller. The IIC is not intended to replace the main system interrupt controller for handling interrupts from all I/O devices.

There are two types of storage domains within the cell processor: local storage domain and main storage domain. The local storage of the SPEs exists in the local storage domain. All other facilities and memory are in the main storage domain. Local storage consists of one or more separate areas of memory storage, each one associated with a specific SPU. Each SPU can only execute instructions (including data load and data store operations) from within its own associated local storage domain. Data transfers to, or from, storage elsewhere in the system may be performed by issuing an MFC DMA command to transfer data between the local storage domain (of the individual SPU) and the main storage domain, unless local storage aliasing is enabled.

An SPU program references its local storage domain using a local address. However, privileged software can allow the local storage domain of the SPU to be aliased into main storage domain by setting the D bit of the MFC_SR1 to '1'. Each local storage area is assigned a real address within the main storage domain. (A real address is either the address of a byte in the system memory, or a byte on an I/O device.) This allows privileged software to map a local storage area into the effective address space of an application to allow DMA transfers between the local storage of one SPU and the local storage of another SPU.

Other processors or devices with access to the main storage domain can directly access the local storage area, which has been aliased into the main storage domain using the effective address or I/O bus address that has been mapped through a translation method to the real address space represented by the main storage domain.

Data transfers that use the local storage area aliased in the main storage domain should do so as caching inhibited, since these accesses are not coherent with the SPU local storage accesses (that is, SPU load, store, instruction fetch) in its local storage domain. Aliasing the local storage areas into the real address space of the main storage domain allows any other processors or devices, which have access to the main storage area, direct access to local storage. However, since aliased local storage must be treated as non-cacheable, transferring a large amount of data using the PPE load and store instructions can result in poor performance. Data transfers between the local storage domain and the main storage domain should use the MFC DMA commands to avoid stalls.

The addressing of main storage in the CBEA is compatible with the addressing defined in the PowerPC Architecture. The CBEA builds upon the concepts of the PowerPC Architecture and extends them to addressing of main storage by the MFCs.

An application program executing on an SPU or in any other processor or device may use an effective address to access the main memory. The effective address may be computed when the PPE performs a load, store, branch, or cache instruction, and when it fetches the next sequential instruction. An SPU program typically provides the effective address as a parameter in an MFC command. The effective address may be translated to a real address according to the procedures described in the overview of address translation in PowerPC Architecture, Book III. The real address refers to the location in main storage which is referenced by the translated effective address. Main storage may be shared by all PPEs, MFCs, and I/O devices in a system. All information held in this level of storage is visible to all processors and to all devices in the system. This storage area can either be uniform in structure, or can be part of a hierarchical cache structure. Programs reference this level of storage using an effective address.

The main memory MEM may include both general-purpose and nonvolatile storage, as well as special-purpose hardware registers or arrays used for functions such as system configuration, data-transfer synchronization, memory-mapped I/O, and I/O subsystems. There are a number of different possible configurations for the main memory MEM. By way of example and without limitation, Table I lists the sizes of address spaces in main memory for a particular cell processor implementation known as Cell Broadband Engine Architecture (CBEA).

TABLE 1

| Address Space | Size | Description |
|---|---|---|
| Real Address Space | $2^m$ bytes | where $m \leq 62$ |
| Effective Address Space | $2^{64}$ bytes | An effective address is translated to a virtual address using the segment lookaside buffer (SLB). |
| Virtual Address | $2^n$ bytes | where $65 \leq n \leq 80$ |

TABLE 1-continued

| Address Space | Size | Description |
|---|---|---|
| Space | | A virtual address is translated to a real address using the page table. |
| Real Page | $2^{12}$ bytes | |
| Virtual Page | $2^p$ bytes | where $12 \leq p \leq 28$ Up to eight page sizes can be supported simultaneously. A small 4-KB (p = 12) page is always supported. The number of large pages and their sizes are implementation-dependent. |
| Segment | $2^{28}$ bytes | The number of virtual segments is 2(n − 28) where $65 \leq n \leq 80$ |

Note:
The values of "m," "n," and "p" are implementation dependent.

The cell processor 100 may include an optional facility for managing critical resources within the processor and system. The resources targeted for management under the cell processor are the translation lookaside buffers (TLBs) and data and instruction caches. Management of these resources is controlled by implementation-dependent tables.

Tables for managing TLBs and caches are referred to as replacement management tables RMT, which may be associated with each MMU. Although these tables are optional, it is often useful to provide a table for each critical resource, which can be a bottleneck in the system. An SPE group may also contain an optional cache hierarchy, the SL1 caches, which represent first level caches for DMA transfers. The SL1 caches may also contain an optional RMT.

In embodiments of the present invention, the main memory MEM contains at some address, a location referred to herein as a lock-line 102 that can be atomically accessed by the SPE and the PPE in a lock-free manner. Code 104, 106 for accessing the lock-line 102 may be stored in the L1 cache of one or more PPE and/or main memory MEM and/or the local store of one or more of the SPE. The instructions may be somewhat different for the SPE and the PPE. Thus, there are two different sets of coded instructions, a first set 104 for the SPE and a different second set 106 for the PPE. As a practical matter, the first set 104 may be transferred to an SPE local store when needed by a SPE and the second set 106 may be transferred to an L1 cache when needed by a PPE. The codes 104, 106 may be subroutines or function calls of a larger program 108 stored in main memory MEM. The code sets 104, 106 allow the SPE and PPE to access and update the lock-line 102 in an atomic fashion.

Since both the SPE and PPE can access the lock line 102 both code sets 104, 106 include features that notify the PPE or SPE in the situation where first processor (SPE or PPE) reads the primitive and the primitive is overwritten by another processor before the first processor can update the primitive. These features make use of the well known instructions "read with reservation" and "conditional write". A read with reservation command, loads data from an address while setting a reservation in the address that will notify the processor making the reservation that another processor has tried to load data into the address between the reservation and a subsequent attempt to write to it. This command is often used in conjunction with the conditional write, in which a processor writes to the address only if the reservation has not been lost. Losing reservation means that the reserved data address could have been modified but does specify if it actually has been modified. To figure out whether the reserved address has been modified, the address must be read back in (e.g., with reservation) and the current value compared to the value of the address when it was reserved.

Conditional write and read with reservation may work as in the example that follows. A first SPU or PPU does conditional write to the lock-line 102. If no other PPU or SPU writes to the lock-line 102, the conditional write is successful. A second SPU or PPU then modifies the lock-line 102 before the first SPU can perform a conditional write. When the first SPU or PPU tries to do the conditional write it finds that its reservation has been lost so the conditional write fails and the value of the primitive 102 is not updated.

By way of example, and without limitation, the SPE may already have the ability to execute 128-byte atomics. The PPE may be of a type that conventionally only has the ability to execute 8-byte atomics. In order to support atomics up to the same size that can be handled by the SPE, the PPE may be configured to support two additional assembly instructions and some changes to the caching behavior of the external cache L2.

In certain existing Cell processor implementations the code set 106 for the PPE may support the following standard atomic operation instructions (atomic operation size is shown in parentheses):
 lwarx—Load word and reserve (4 bytes)
 ldarx—Load double-word and reserve (4 bytes)
 stwcx—Store word conditionally (8 bytes)
 stdcx—Store double-word conditionally (8 bytes)

According to an embodiment of the present invention code set 106 for the PPE may be configured to support two new instructions:
 lllarx—Load lock-line and reserve (128 bytes, or other lock-line size). This instruction allows the PPE to load data from the lock-line 102 in main memory MEM into a corresponding location X in the external cache L2 while reserving the data in a second location Y in the external cache L2.
 stllcx—Store lock-line conditionally (128 bytes, or other lock-line size). This instruction allows the PPE to store data loaded into the location Y back to the lock-line 102 in main memory MEM if a previous reservation of the data in location Y by the PPE has not been lost.

The stllcx instruction may move the 128 bytes of data from the external cache L2 back to the lock-line 102 in one or more operations depending on the characteristics of the Memory Interface Controller MIC. For example, in some Cell processor implementations, the Memory Interface Controller MIC may operate in 16-byte increments. In such a case the stllcx instruction may require 8 operations to transfer all 128 bytes.

These instructions may be implemented by threads running on the PPE. One or more such threads may be part of the program 108. These threads may be implemented as part of the codes 104, 106 implemented by the PPE and SPE. As used herein, a "thread" generally refers to a part of a program that can execute independently of other parts. Operating systems that support multithreading enable programmers to design programs whose threaded parts can execute concurrently. When a thread is interrupted, a context switch may swap out the contents of a PPE external cache L2 or an SPE local storage to the main memory MEM and substitute up other data and/or code from the main memory. The substitute data and code are the processed by the SPU or PPU that was interrupted. As used herein, a context switch refers to the computing process of storing and restoring the state of a SPE or PPE (the context) such that multiple processes can share a single resource.

The lllarx and stllcx instructions act similar to the standard atomic instructions, except that they can operate on a memory size that is larger than that which may be handled by the standard atomic instructions. The lllarx and stllcx instructions may operate on a memory size as large as the memory size unit handled by the SPE, e.g., 128-byte-aligned 128-byte lines of memory. By way of example, in order to retrieve 128 bytes, the lllarx instruction may take two register parameters: one contains the destination address for storing 128 bytes, and one with the source address. Similarly, a stllcx instruction may take the same two parameters.

Figure 2:
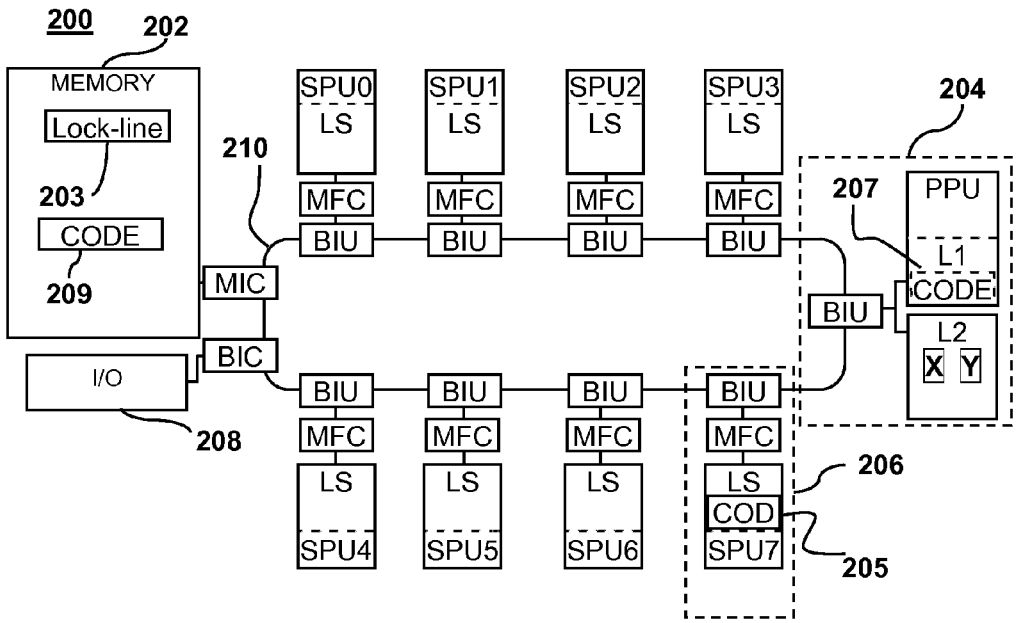
FIG. 2 is a schematic diagram of a cell processor configured to implement atomic operations according to an embodiment of the present invention.

FIG. 2 depicts an example of cell processor 200 configured to implement PPE and SPE accessible atomic operations according to an embodiment of the present invention. The cell processor 200 includes a main memory 202, a single PPE 204 and eight SPEs 206. Although eight SPE are shown in this example, the cell processor 200 may be configured with any number of SPE. With respect to FIG. 2, the memory, PPE, and SPE can communicate with each other and with an I/O device 208 over a ring-type element interconnect bus 210. The memory 202 may be accessed by the PPE 204 and SPEs 206 via a memory interface controller MIC. The memory 202 contains a lock-line 203 having features in common with the lock-line 102 described above and a program 209 having features in common with the program 108 described above. At least one of the SPE 206 includes in its local store code 205 having features in common with the code 104 described above. The PPE 204 includes an internal cache L1 and an external cache L2. The PPE 204 includes in its internal cache L1, code 207 having features in common with the code set 106 described above. Codes 205, 207 may also be stored in memory 202 for access by the SPE 206 and PPE 204 when needed.

Figure 3A:
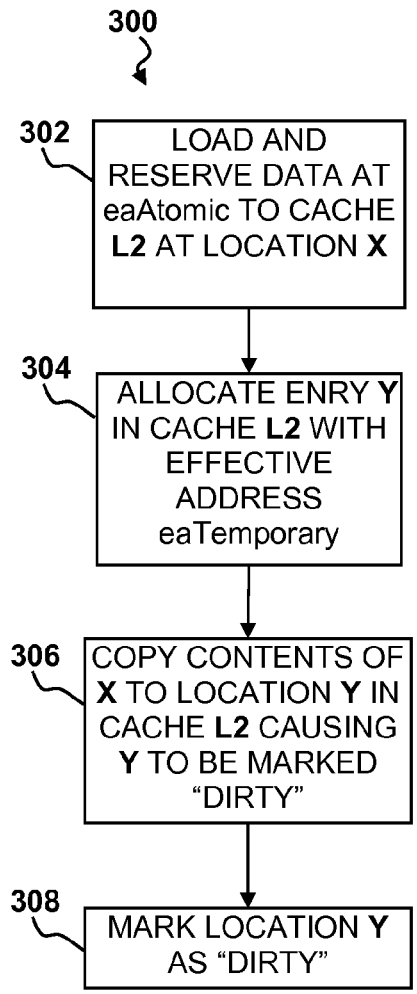
FIG. 3A is a flow diagram illustrating a method for atomic operation according to an embodiment of the present invention.

An example of an lllarx instruction 300 in the context of a 128-byte atomic may be understood with reference to FIG. 3A. The syntax of the lllarx instruction is lllarx(eaTemporary, eaAtomic). In this example, eaAtomic refers to a location in main memory, X and Y refer to locations in L2 cache and eaTemporary refers to an address associated with location Y in L2.

As indicated at 302, 128 bytes at the location eaAtomic in main memory 202 may be loaded and reserved into the external cache L2 at location X. By way of example, and without loss of generality, the PPE 204 may transfer all 128 bytes at once or in smaller increments, e.g., in 16-byte chunks, depending on the Cell bus architecture.

Using existing L2 logic, a new 128 byte entry may be allocated at location Y in the external cache L2 for the PPE 204 with an effective address eaTemporary, as indicated at 304. Within the cache L2, the contents of X is copied into Y, as indicated at 306, which causes Y to be marked "dirty", as indicated at 308. Marking Y as "dirty" refers to generally making an indication that the contents of Y have been changed subsequent to a prior reservation. By way of example, the cache logic of the external cache L2 of the PPE 204 may support a dirty flag to perform this function.

Figure 3B:
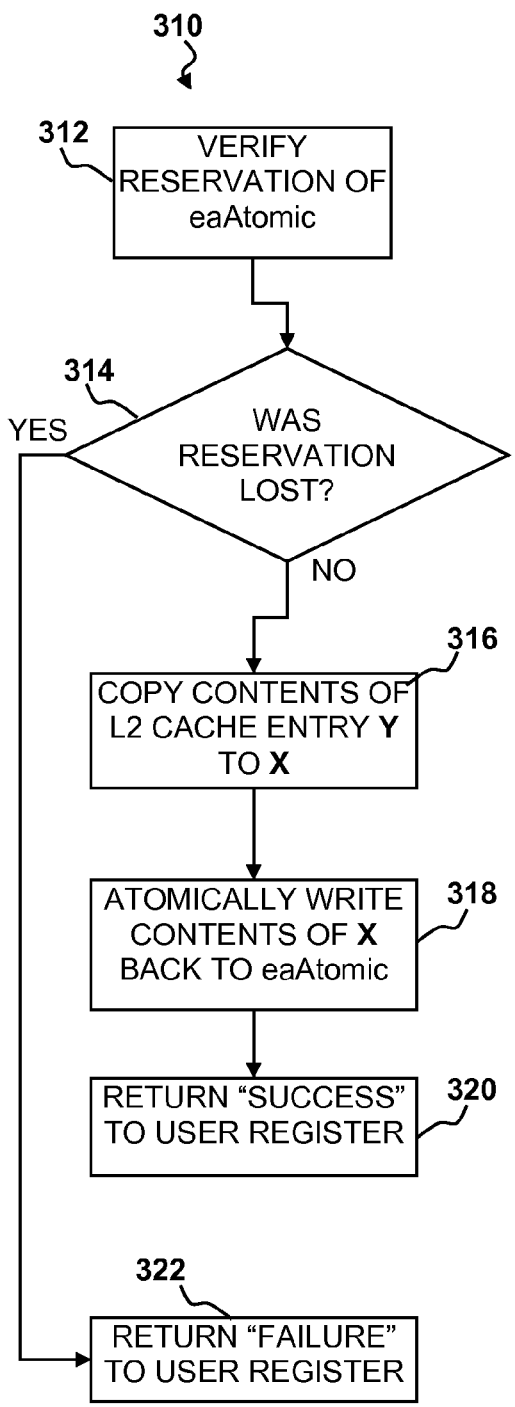
FIG. 3B is a flow diagram illustrating example of use of a stllcx instruction a method for atomic operation in the context of according to an embodiment of the present invention.

An example of a stllcx instruction 310 in the context of a 128-byte atomic may be understood with reference to FIG. 3B. The syntax of the stllcx instruction is stllcx (eaTemporary, eaAtomic). Using existing L2 and MFC logic, a given thread that had previously made a reservation of eaAtomic (e.g., with an lllarx instruction) may verify the reservation of eaAtomic as indicated at 312. If at 314 the reservation of eaAtomic is still held by the same PPE thread that had previously made the reservation, the contents of L2 cache entry Y are copied to X as indicated at 316, the contents of X are atomically written back to its corresponding main memory address eaAtomic as indicated at 318 and success is returned to a user register as indicated at 320. If at 314 the reservation of eaAtomic has been lost, failure is returned to a user register as indicated at 322. The reservation may have been lost, e.g., if a different thread running on the PPE 204 or an SPE 206 subsequently performs an lllarx instruction and, consequently, marks entry Y as "dirty".

Embodiments of the present invention facilitate utilization of the large size atomic operations that are possible with the SPE while making possible atomic operations on a PPE that otherwise would involve atomics that are too large to be handled by prior art PPE instruction sets. Embodiments of this invention may be used in SPU task management, particularly when it is important for both the SPUs and the PPU to be able to atomically add new tasks to be executed. Although the above discussion refers to 128-byte atomics, it is noted that the lllarx and stllcx instructions may be implemented on atomics of any size. Furthermore, although the preceding discussion addresses the use of large-sized atomic operations in a Cell processor, they may also be implemented in a processor that is not part of a Cell, e.g., a stand-alone power processor, a processor that is part of a dual core, quad core or other parallel processor.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. In a processor system comprising a main memory and a first processor element including a first processor unit coupled to an external cache, a method for atomic operation, the method for executing an atomic operation instruction, the method comprising:
   a) when executing the atomic operation instruction with the first processor unit, atomically loading data from a lock-line in the main memory into a first location X in the external cache, wherein a size of the data is larger than a data size for standard atomic operations with the first processor unit, wherein the lock-line is accessible by the first processor unit and a second processor unit in a lock-free manner, wherein the first and second processor units have different reservation sizes for atomic operations, wherein a data size for the lock-line is larger than a reservation size for standard atomic operations with the first processor unit; and
   b) when executing the atomic operation instruction reserving the data in a second location Y in the external cache, wherein reserving the data in the second location includes
   copying the contents of the first location X into the second location Y; and
   making an indication that the contents of the second location Y have been changed subsequent to a prior reservation.

2. The method of claim 1, wherein a data size of the lock-line is as large as or larger than a reservation size for atomic operations performed by the second processor unit.

3. The method of claim 2 wherein the data size of the lock line is 128 bytes.

4. The method of claim 2, further comprising, storing data to the lock-line with the second processor unit.

5. The method of claim 4, wherein the second processor unit stores data to the lock-line prior to a).

6. The method of claim 4 wherein a data size of the lock-line is as large as a data size for atomic operations that may be performed by the second processor unit.

7. The method of claim 4 wherein the data size of the lock line is 128 bytes.

8. The method of claim 7 wherein the data size for the standard atomic operations that may be performed with the first processor unit is 8 bytes.

9. The method of claim 1, further comprising:
with the first processor unit, storing data loaded into the second location Y back to the lock-line if a previous reservation of the data in location Y by the first processor unit has not been lost.

10. The method of claim 1 wherein a) and b) are performed by a thread running on the first processor unit.

11. The method of claim 10 wherein b) includes:
copying the contents of the first location X into the second location Y; and
making an indication that the contents of the second location Y have been changed subsequent to a prior reservation by a different thread.

12. The method of claim 11, wherein the different thread is a thread running on the second processor unit.

13. A processor system, comprising:
a main memory;
a first processor element coupled to the main memory, wherein the first processor element includes a first processor unit coupled to an external cache, wherein the first processor element has embodied therein a processor executable instruction that, when executed by the first processor element, implement a method for atomic operation, the instruction comprising:
a) atomically loading data from a lock-line in the main memory into a first location X in the external cache, wherein a size of the data is larger than a data size for standard atomic operations that may be performed with the first processor unit, wherein the lock-line is accessible by the first processor unit and a second processor unit in a lock-free manner, wherein the first and second processor units have different reservation sizes for atomic operations, wherein a data size for the lock-line is larger than a reservation size for standard atomic operations with the first processor element; and
b) reserve the data in a second location Y in the external cache, wherein reserving the data in the second location includes copying the contents of the first location X into the second location Y; and making an indication that the contents of the second location Y have been changed subsequent to a prior reservation.

14. The system of claim 13, further comprising one or more second processor elements coupled to the first processor unit.

15. The system of claim 14 wherein a data size of the lock-line is as large as or larger than a data size for atomic operations that may be performed by the second processor units.

16. The system of claim 15 wherein the data size of the lock line is 128 bytes.

17. The system of claim 15, wherein one or more of the second processor units include instructions that, when executed by the one or more second processor units, store data to the lock-line.

18. The system of claim 17 wherein the data size of the lock line is 128 bytes.

19. The system of claim 18 wherein the data size for the standard atomic operations that may be performed with the first processor unit is 8 bytes.

20. The system of claim 13 wherein the first processor unit further has embodied therein processor executable instructions that, when executed by the first processor unit store data loaded into the second location Y back to the lock-line if a previous reservation of the data in location Y by the first processor unit has not been lost.

21. The system of claim 13 wherein main memory has embodied therein a program comprising one or more threads, wherein one or more of the threads includes command for the instructions a) and b) to be executed by the first processor unit.

22. The system of claim 21 wherein b) includes:
an instruction that, when executed by the first processor unit, copies the contents of the first location X into the second location Y; and
an instruction that, when executed by the first processor unit, makes an indication that the contents of the second location Y have been changed subsequent to a prior reservation by a different thread.

23. A non-transitory processor readable medium having embodied therein a processor executable instruction configured to implement a method for atomic operation on a processor system comprising a main memory and a first processor element, wherein the first processor element includes a first processor unit and an external cache, the instruction comprising:
a) atomically loading data from a lock-line in the main memory into a first location X in the external cache, wherein a size of the data is larger than a data size for standard atomic operations that may be performed with the first processor unit, wherein the lock-line is accessible by the first processor unit and a second processor unit in a lock-free manner, wherein the first and second processor units have different reservation sizes for atomic operations, wherein a data size for the lock-line is larger than a reservation size for standard atomic operations with the first processor element; and
b) reserving the data in a second location Y in the external cache, wherein reserving the data in the second location includes copying the contents of the first location X into the second location Y; and making an indication that the contents of the second location Y have been changed subsequent to a prior reservation.

* * * * *